June 17, 1947.   F. T. COURT   2,422,530
RELEASABLE POWER OPERATED TRACTOR AND TRAILING PLOW CONNECTIONS
Filed July 1, 1943   2 Sheets-Sheet 1
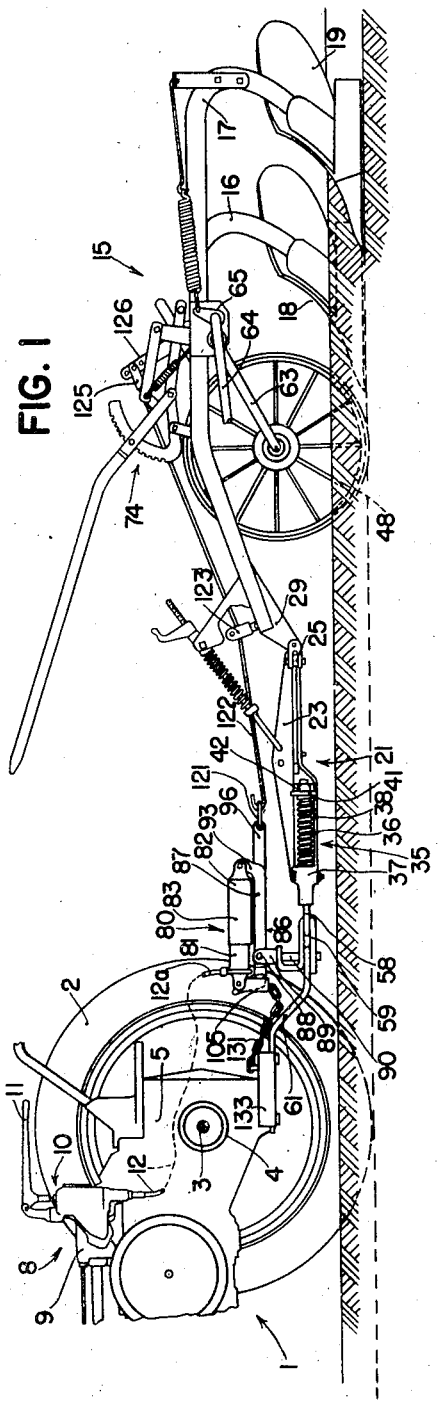
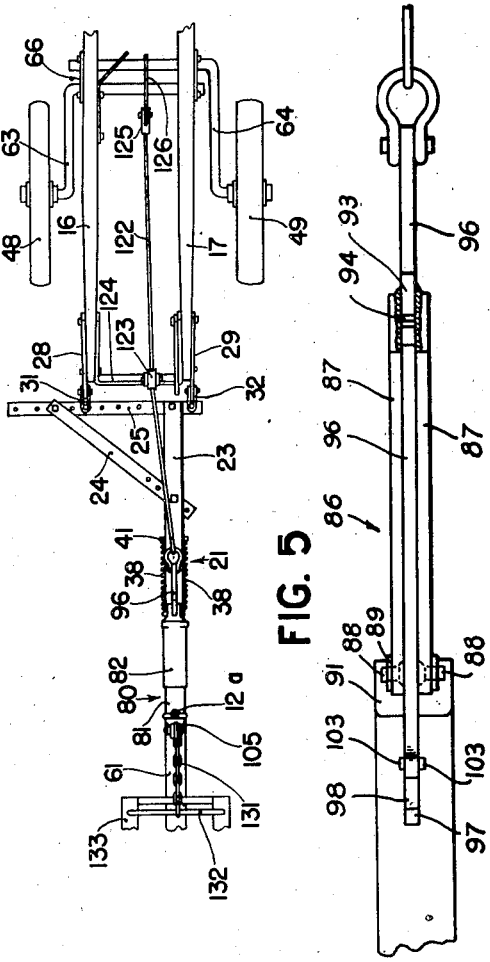
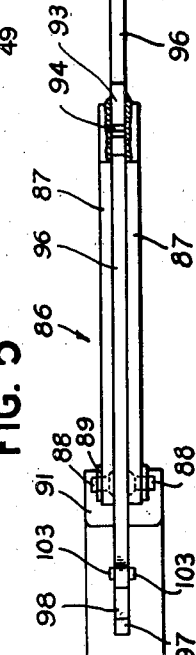
*INVENTOR.*
FRANK T. COURT
ATTORNEYS June 17, 1947.  F. T. COURT  2,422,530
RELEASABLE POWER OPERATED TRACTOR AND TRAILING PLOW CONNECTIONS
Filed July 1, 1943  2 Sheets-Sheet 2

INVENTOR.
FRANK T. COURT
BY
ATTORNEYS

Patented June 17, 1947

2,422,530

UNITED STATES PATENT OFFICE 2,422,530

RELEASABLE POWER-OPERATED TRACTOR AND TRAILING PLOW CONNECTIONS

Frank T. Court, Moline, Ill., assignor to Deere & Company, Moline, Ill., a corporation of Illinois Application July 1, 1943, Serial No. 493,144

11 Claims. (Cl. 97—50)

The present invention relates generally to agricultural implements and more particularly to tractor propelled machines in which power actuated means is provided for adjusting the implement parts, usually ground working tools, and moving them into and out of transport and working positions.

The object and general nature of the present invention is the provision of means acting through the power operated lifting connections for automatically reducing the depth of operation when the implement encounters abnormal loads. More specifically, as applied to a tractor plow, an important feature of the present invention resides in the provision of a cushion hitch, involving yielding means adapted to shift when the draft loads become excessive, in connection with an arrangement of the power lift parts which acts through the power lift connections for automatically reducing the depth of plowing. Further, it is a feature of this invention to provide mechanism of this kind which automatically releases the power lift connection when the hitch is released or otherwise becomes disconnected.

These and other objects and advantages of the present invention will be apparent to those skilled in the art after a consideration of the following detailed description, taken in conjunction with the accompanying drawings, in which Figure 1 is a fragmentary side view of a tractor and towed plow, in which the principles of the present invention have been incorporated.

Figure 2 is a partial plan view of the outfit shown in Figure 1.

Figure 5 is a fragmentary view showing the details of the carrier for releasably supporting the power lift cylinder.

Figure 3:
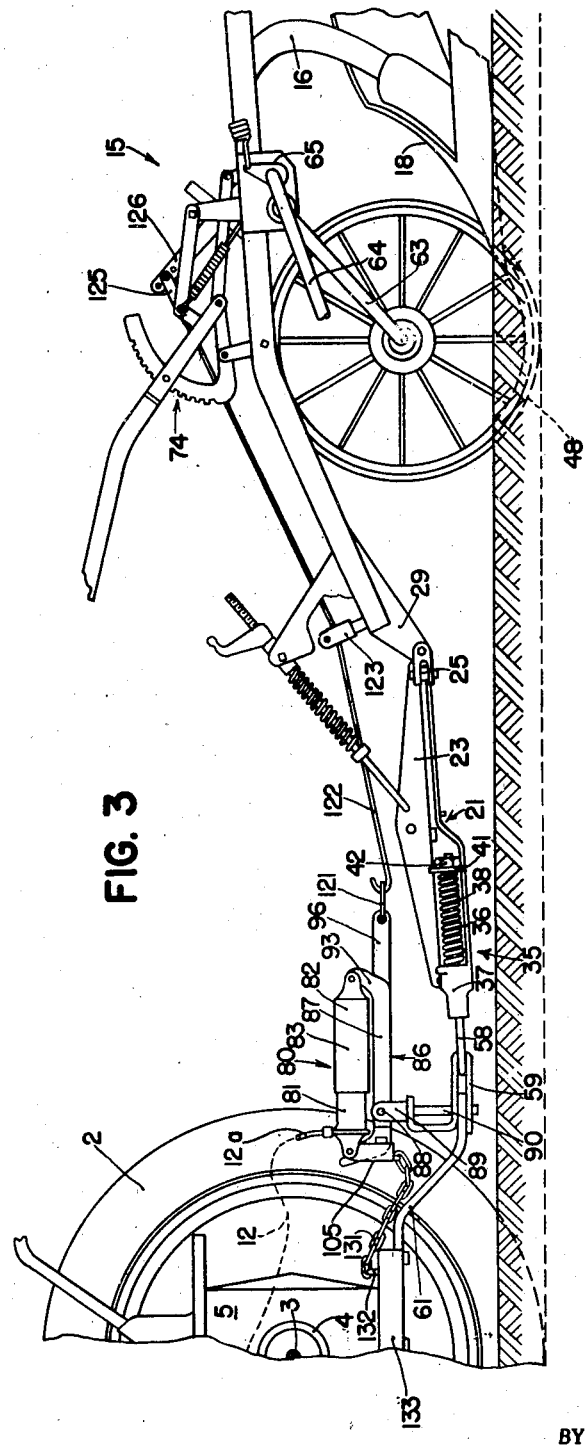
Figure 3 is a view similar to Figure 1 showing the parts in the positions they occupy when the cushion hitch yields, as under an overload, and causes the tools to be moved into a more shallow operating position.

Referring now to the drawings, particularly Figures 1 and 2, the reference numeral 1 indicates a tractor which is more or less of conventional construction and hence has been illustrated only fragmentarily. The tractor 1 includes rear drive wheels 2 fixed to drive axles 3 that are journaled for rotation in a rear axle housing 4. The latter is secured to or forms a part of a transmission housing 5. The tractor 1 is equipped with a controlled source of fluid pressure, indicated in its entirety by the reference numeral 8 and which comprises a fluid pump driven from the shaft of the tractor governor 9 and suitable controlling valve mechanism 10 which is actuated by a valve lever 11. A fluid conduit in the form of a flexible hose connection 12 extends from the power unit 8 to a point of utilization. The present invention is not especially concerned with the particular details of the power unit 8, the same being preferably of the same construction as shown in the co-pending application of Jay D. Johnson, Serial No. 398,539, filed June 18, 1941, now United States Patent 2,340,474, issued February 1, 1944, to which reference may be made if necessary. Further description is therefore unnecessary except to point out that moving the valve lever 11 upwardly causes fluid to be forced outwardly through the conduit 12 under pressure. Releasing the lever 11 locks the fluid in the conduit 12 and associated connections, and depressing the lever 11 permits fluid to flow back into the power unit 8.

The present invention is particularly concerned with the provision of hydraulic power operated mechanism, arranged not only to adjust the plowing depth of the tools but also to raise and lower them into and out of transport position, in connection with a hitch for the implement which is of the spring cushioned type that cushions the transmission of draft forces and yields in the event there is an overload. The present invention is further particularly concerned with the provision of such hitch and lifting connections that, during the yielding of the cushion hitch, the plowing depth of the tools is automatically adjusted.

A control of this kind may be provided for any kind of implement, but to illustrate the principles of the present invention I have chosen to show an implement of the ground working type, namely, a plow which is indicated in its entirety by the reference numeral 15. The plow 15 as illustrated is of the two bottom towed type and includes a pair of plow beams 16 and 17 to the lower rear ends of which plow bottoms 18 and 19 are connected in the usual way. The forward ends of the beams 16 and 17 are connected to a vertically swingable hitch, indicated in its entirety by the reference numeral 21, which includes a longitudinal draft member 23 and a diagonal brace 24, to the rear ends of both of which a transverse bar 25 is connected. Draft brackets 28 and 29 are connected to the forward ends of the plow beams 16 and 17, and are connected, respectively, by clevises 31 and 32 to the transverse hitch bar 25, the latter member having a plurality of openings therein to receive the clevises 31 and 32 in different positions of lateral adjustment as may be required.

The forward end of the draft member 23 is formed as a frame, indicated at 35 in Figure 1, in which a draft bolt 36 is slidably mounted. The frame 35 includes a casting 37 at the forward end of the draft member 23, and the draft bolt 36 is generally in the form of a U-shaped member, the ends of which are disposed within cushioning springs 38 that are confined between the rear end of the casting 37 and a slidable washer 41 which is apertured to receive the rear ends of the draft bolt 36. The ends of the draft bolt 36 are threaded to receive nuts 42 by which the plate 41 is held in place. The front end or loop 58 of the draft bolt 36 is received by a clevis 59 which is pivoted to the rear end of the tractor drawbar 61.

The parts just described form a spring cushion hitch mechanism of the type which, under an overload, yields to a certain degree, permitting the implement to drop back or move rearwardly relative to the tractor to a limited extent. This is accomplished by the yielding of the cushioning springs 38.

The plow 15 also includes a pair of crank axles 63 and 64 which are journaled for rocking movement in brackets 65 and 66 that are secured, respectively, to the plow beams 16 and 17. Each of the crank axles includes a laterally turned end upon which a ground wheel is mounted. The ground wheel 48 shown in Figure 1 constitutes the right furrow wheel of the plow, and the other ground wheel 49 (Figure 2) constitutes the land wheel of the plow. The crank axles are connected to swing together by an adjustable leveling linkage indicated in its entirety in Figure 1 by the reference numeral 74 and which is substantially the same as the leveling linkage shown in the co-pending application filed by myself and Theophilus Brown, on June 26, 1941, Serial No. 399,852, now United States Patent 2,344,123, issued March 14, 1944.

Figure 4:
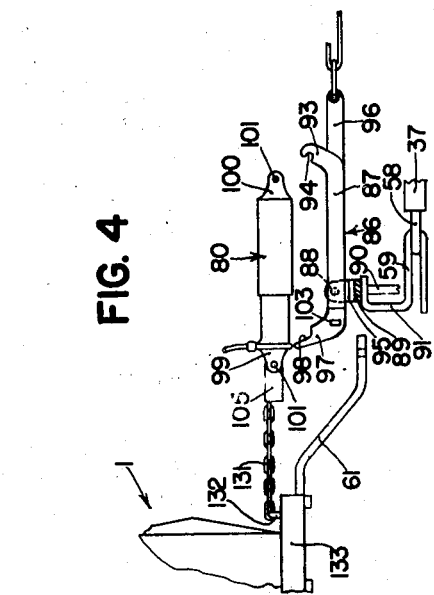
Figure 4 shows the release of the power lift cylinder.

The position of the crank axles 63 and 64 is controlled by the tractor hydraulic power unit 8 through mechanism which will now be described. A hydraulic cylinder and piston unit, indicated in its entirety by the reference numeral 80, is connected to the rear end 12a of the flexible hose connection 12 and receives fluid under pressure from and is controlled by the unit 8 on the tractor. Briefly, the unit 80, which is referred to later as a power operated adjusting means, includes a cylinder 81 and a piston 82 having a protecting sleeve 83 telescopically associated with the cylinder 81. The unit 80 is mounted on the tractor drawbar 61 by means of a carrier indicated in its entirety by the reference numeral 86. The carrier 86 includes a pair of strap members 87 connected by a pair of pivots 88 to a U-shaped bracket 89 that is fixed to the upper end of a pivot pin 90 serving to connect the hitch bolt 36 with the tractor drawbar 61. The pin 90 is of extended length so as to support the cylinder 80 with ample clearance, and in order to hold the bracket 89 in proper position the clevis has an upper extension 91 terminating in an upper horizontal end apertured to receive the pin 90. The cylinder 80, being carried entirely on the pin 90, is free to swing laterally. The pin 90 serves as a break pin in the event abnormal loads are encountered. The piston and cylinder unit or power operated adjusting means 80, the carrier 86 and the supporting break pin 90 are referred to later as forming adjusting means for adjusting the operating depth of the plow 15, as by swinging the crank axles 63 and 64, and the carrier 86 is referred to later as mechanism supporting the power operated means 80 on its support, which, as shown in Figures 2 and 4, comprises the break pin 90 and the clevis 59. The latter are, so long as they are in place (Figure 3), adapted to serve as draft transmitting means and, being carried by the tractor drawbar 61, are supported by the tractor.

The strap members 87 of the carrier 86 are spaced apart laterally and extend rearwardly, terminating in upturned ends to which a cylinder receiving lug 93 is fixed, as by welding. The lug 93 has a downwardly and rearwardly inclined open end slot 94 formed therein. The front ends of the strap members 87 are connected together by a transverse plate 95 which is welded to the lower edges of the strap members 87. A longitudinally extending strap 96 is disposed for sliding movement between the strap members 87, being guided in such sliding movement by the connection 95 and the lower edge of the cylinder-receiving lug 93.

The front end of the slidable strap member 96 is formed with a cylinder-receiving lug 97 spaced longitudinally of the other cylinder-receiving lug 93. The front cylinder-receiving lug 97 is provided with a slot or recess 98 (Figure 4). The hydraulic cylinder and piston unit 80 is provided with two pairs of attaching ears 99 and 100, each pair being apertured and carrying a pivot pin 101. The attaching ears 99 and 100 are spaced apart a distance slightly greater than the thickness of the cylinder-receiving lugs 93 and 97, and the slots or notches 94 and 98 are adapted to receive the cylinder attaching pins 101, the rear pin being adapted to be seated in the downwardly and rearwardly inclined slot 94 whereby, so long as the front pin 101 remains seated in the notch 98 of the front lug 97, the unit 80 is held in position.

The means for holding the cylinder unit 80 in place includes a U-shaped latch member 105 swingably mounted on the front pin 101 and is so constructed that when the cylinder 80 is in position, the latch or U-shaped member 105 is swingable into a position (Figure 1) embracing the front end of the slidable member 96 and coacting therewith to prevent the front end of the cylinder 80 from raising out of the notch 98. Since the front end of the cylinder 80 is thus held in position, the rear end will also be held in attached relation with the rear cylinder-receiving lug 93. Since the strap members 87 and 96 are mounted on the pin 90, and since they form the major part of the cylinder carrier 86, the cylinder unit 80 is adapted to swing laterally, as may be required, about substantially the same axis as the implement itself swings relative to the tractor. The strap members 87 constitute anchoring means, since they are prevented by virtue of their attachment to the pivot pin 90 from moving longitudinally of the implement, and therefore when fluid is forced into the cylinder 80, the latter is extended and the strap member 96 shifted longitudinally forwardly between the other strap members 87. The rear end of the strap member 96 is apertured to receive a clevis or connection member 121 to which the forward end of a longitudinally shiftable rod 122 is connected. Preferably, the front end of the slide bar 96 has a stop 103 to limit the rearward swinging of the latch member 105. The front end of the rod 122 is formed as a hook to engage the clevis 121. The rod 122 passes through a guide sheave 123 fixed to the plow in any suitable manner, preferably by being bolted to a transverse brace 124 connecting the front ends of the plow beams 16 and 17. The rear end of the rod 122 is connected by means of a clevis 125 to an arm 126, the lower end of which is fixed to the central portion of the crank axle 64. Thus, when fluid is forced into the cylinder 80, the slidable member 96 and the rod member 122 are stressed in tension and are shifted forwardly, thus swinging the crank axle 64 downwardly. The parts 96 and 122 therefore constitute a tension connection extending from the unit 80 back to the arm 126 on the implement, the arm 126 constituting a means on the implement for adjusting the depth since swinging the arm 126 acts through associated parts to swing the crank axles 63 and 64 and thus raise or lower the plow frame. Since both of the crank axles 63 and 64 swing together through the leveling linkage 74, extension of the piston and cylinder unit 80 acts through the crank axles 63 and 64 and associated ground wheels to raise the plow, and as long as the fluid is locked within the cylinder unit 80, the plow is held in raised position. The plow may be lowered into operating position by releasing the fluid from the cylinder unit 80 and permitting the fluid to flow back to the power unit 8 on the tractor through the hose connection 12. Thus, the operator on the tractor may raise and lower the plow as desired merely by operating the valve lever 11. Also, the depth of plowing may be adjusted by directing small quantities of fluid into the cylinder unit 80 or permitting small quantities of fluid to flow from the cylinder unit 80 back to the tractor.

According to the principles of the present invention, when the cushion springs 38 yield, as under a temporary overload, the depth of plowing is automatically reduced. This is illustrated in Figure 3 wherein will be seen that the springs 38 have been compressed and the plow 15, as a whole, shifted rearwardly relative to the tractor a small amount. Since the front end of the tension member 122 is connected through the cylinder unit 80 with a part on the tractor, any rearward movement of the plow 15 relative to the tractor, causes the arm 126 on the crank axle 64 to be swung forwardly, since the tension member 122 cannot move rearwardly when the plow moves rearwardly. This, in effect, swings the crank axles 63 and 64 downwardly and raises the plow bottoms 18 and 19. The amount of elevation of the plows effected by the yielding of the springs 38 has, in Figure 3, been somewhat exaggerated in order to illustrate the action involved. Thus, if the plows should strike a hard spot, resulting in an increase in the draft sufficient to compress the springs 38, the plow will drop back and the bottoms will be raised until the hard spot is passed. After that, the springs 38 will expand and move the plow forwardly relative to the tractor which will result in the plow bottoms lowering into their normal position, as shown in Figure 1. It is important to note that this automatic adjustment of the plowing depth in response to changes in the amount of draft is, according to the present invention, effected through the same connection that the power unit on the tractor acts to adjust the plowing depth and also to raise the plow into its transport position. This I believe to be broadly new.

The latch 105 of the cylinder carrier 86 is connected by a chain 131 with a transverse rod 132 supported on the drawbar support 133 of a tractor. Normally, as shown in Figures 1 and 3, the chain 131 is slack so as to accommodate any swinging of the cylinder unit 80, as may occur when the tractor turns relative to the plow. However, in order to prevent breaking the hose 12 if the pivot pin 90 should break, the chain 131 is connected directly between the latch 105 and the tractor, as just described. Figure 4 shows the relation of the parts in the event the pin 90 breaks, thus disconnecting the plow from the tractor. After the break occurs and as the tractor continues to move forwardly, the chain 131 is tightened, swinging the latch 105 forwardly away from the front end 97 of the bar 96. The notch 98 slopes upwardly and forwardly, and therefore the continued forward movement of the tractor relative to the plow merely draws the cylinder unit 80 away from the carrier 86, thus preventing any damage to the hose 12. The latch 105 and chain 131, together with associated parts, thus constitute mechanism for releasing the cylinder unit 80 from its carrier 86, as shown in Figure 4.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. The combination with a tractor, of an implement having a part to be adjusted, releasable cushioning means connecting said implement with the tractor, adjusting means carried by the tractor and including a support releasable from the tractor with the implement and means operated by power derived from the tractor, mechanism releasably supporting said power operated means on said support, said power operated means being releasable from said support when said support is released from the tractor, a connection from said power operated means to said implement part for adjusting the position of the latter, and means for releasing said power operated means from its supporting mechanism when the implement and said support are released from the tractor.

2. The combination of a tractor having a source of fluid pressure, an implement having a part adapted to be shifted from one position to another and to intermediate positions, cushion hitch means of the releasable type connecting the implement with the tractor, a fluid pressure operated unit adapted to be connected to operate said implement part and mounted in interconnected relation with the tractor forward of said cushion hitch means, tension means releasably connected between said fluid pressure operating unit and said implement part, said unit acting through said tension means when the implement shifts rearwardly relative to the tractor by the yielding of said cushion connection to shift said implement part into an intermediate position, said fluid pressure operating unit deriving energy from said source of fluid pressure on the tractor for shifting said implement part into a raised position, and means operative when said cushion hitch means is released from the tractor for releasing said releasable tension means from said fluid operated unit.

3. The combination of a tractor, an implement having ground working tools, means on the implement for adjusting the working depth of said tools, yieldable hitch means connecting said implement with the tractor, a tension connection extending forwardly from the depth adjusting means on the implement, a pair of relatively movable parts releasably carried by the tractor, one being connected to said tension connection, an operating unit deriving energy from the tractor and supported releasably by said relatively movable parts, said tension connection acting at one end through said parts and operating unit against the tractor and at the other end against said implement depth adjusting means so that when said hitch means yields the depth of operation of said tools is automatically reduced, and means for disconnecting said operating unit from said relatively movable parts in the event the hitch connection between the implement and the tractor becomes disconnected.

4. In combination, a tractor, an implement, disconnectible yieldable means connecting the implement and the tractor, a support removably supported on the tractor, a fluid cylinder device removably carried on said support, a tension connection between said device and the implement arranged to raise the latter when the implement shifts rearwardly relative to the tractor, as under a moderate overload, said yielding means being disconnectible so as to release the implement from the tractor under conditions of excessive overload, and mechanism for releasing the fluid cylinder device from said support when the implement is disconnected from the tractor.

5. The invention set forth in claim 4, further characterized by said tractor having a drawbar and said disconnectible yielding means including a clevis releasably connected to the tractor drawbar and a cushioning unit connecting the implement to said clevis, and means mounting said support on said clevis.

6. In combination, a tractor, an implement, disconnectible yielding means connecting the implement and the tractor, a support removably mounted relative to the tractor, a fluid cylinder device, a tension connection between said device and the implement arranged to raise the latter when the implement shifts rearwardly relative to the tractor, as under a moderate overload, said yielding means being disconnectible so as to release the implement from the tractor under conditions of excessive overload, and mechanism for releasing the fluid cylinder device from said support when the implement is disconnected from the tractor, said disconnectible yielding means including a first member releasably connected to the tractor drawbar, a second member having a cushioned hitch connection with said first member, and means mounting said support on one of said members.

7. In combination, a tractor, an implement having a hitch with a yielding connection at its front end, a part releasably connected with the tractor and serving to transmit draft therefrom to said yielding connection, power operated adjusting means mounted releasably on said part and releasably connected with said implement to adjust the latter by movement relative thereto in the same direction that draft is applied through said yielding connection to the implement, and mechanism operative by forward movement of the tractor relative to said part after the latter is released from the tractor to release said power operated adjusting means from said part.

8. An agricultural implement adapted to be connected with a tractor having a source of fluid pressure, comprising an implement having a part adapted to be shifted from one position to another and to intermediate positions, cushion hitch means of the releasable type for connecting the implement with the tractor, a fluid pressure operated unit connected to operate said implement part and adapted to be operatively connected with said source of fluid pressure on the tractor, tension means releasably connected between said fluid pressure operating unit and said implement part, said unit acting through said tension means when the implement shifts rearwardly relative to the tractor by the yielding of said cushion connection to shift said implement part into an intermediate position, said fluid pressure operating unit deriving energy from said source of fluid pressure on the tractor for shifting said implement part into a raised position, and means operative when said cushion hitch means is released from the tractor for releasing said releasable tension means from said fluid operated unit.

9. In a tractor propelled implement having a part adapted to be shifted from one position to another and to intermediate positions and adapted to be releasably connected in yielding relation to a tractor having a source of fluid pressure, a fluid pressure operated unit, tension means releasably connected between said fluid pressure operating unit and said implement part, said unit acting through said tension means when the implement shifts rearwardly relative to the tractor by the yielding of said yielding connection to shift said implement part into an intermediate position, said fluid pressure operating unit deriving energy from said source of fluid pressure on the tractor for shifting said implement part into a raised position, and means operative when said implement is released from the tractor for releasing said releasable tension means from said fluid operated unit.

10. Power operated adjusting mechanism for an implement having a part adapted to be shifted from one position to another and to intermediate positions and adapted to be releasably connected by yielding means to a tractor having a source of fluid pressure, said adjusting mechanism comprising a support removably supported on the tractor, a fluid cylinder device removably carried on said support, a tension connection between said device and said implement part arranged to raise the latter when the implement shifts rearwardly relative to the tractor, as under a moderate overload, said yielding means being disconnectible so as to release the implement from the tractor under conditions of excessive overload, and mechanism for releasing the fluid cylinder device from said support when the implement is disconnected from the tractor.

11. Power operated adjusting mechanism for an implement having a part adapted to be shifted from one position to another and to intermediate positions and adapted to be releasably connected by yielding means to a tractor having a source of fluid pressure, said adjusting mechanism comprising a support removably mounted relative to the tractor, a fluid cylinder device, a tension connection between said device and said implement part arranged to raise the latter when the implement shifts rearwardly relative to the tractor, as under a moderate overload, said yielding means being disconnectible so as to release the implement from the tractor under conditions of excessive overload, and mechanism responsive to forward movement of the tractor relative to the implement for removing said fluid cylinder device from said support when the implement is disconnected from the tractor.

FRANK T. COURT.

REFERENCES CITED

The following references are of record in the file of this patent:

UNITED STATES PATENTS

| Number | Name | Date |
|---|---|---|
| 1,777,487 | Goodwill | Oct. 7, 1930 |
| 2,292,961 | Mott | Aug. 11, 1942 |
| 1,273,069 | Keckritz | July 16, 1918 |
| 2,369,437 | Court | Feb. 13, 1945 |

FOREIGN PATENTS

| Number | Country | Date |
|---|---|---|
| 108,038 | Australia | July 19, 1939 |